United States Patent [19]

Prasanna et al.

[11] Patent Number: 5,468,069
[45] Date of Patent: Nov. 21, 1995

[54] SINGLE CHIP DESIGN FOR FAST IMAGE COMPRESSION

[75] Inventors: Viktor K. Prasanna, Pacific Palisades; Cho-Li Wang, Monterey Park, both of Calif.; Heonchul Park, Seoul, Rep. of Korea

[73] Assignee: University of So. California, Los Angeles, Calif.

[21] Appl. No.: 100,928

[22] Filed: Aug. 3, 1993

[51] Int. Cl.$^6$ .................................. G06K 9/36; G06K 9/68
[52] U.S. Cl. .......................... 382/253; 382/226; 348/422; 358/426
[58] Field of Search ........................ 382/56, 37; 348/422; 358/426, 433

[56] References Cited

U.S. PATENT DOCUMENTS

| | | | |
|---|---|---|---|
| 4,807,298 | 2/1989 | Conte et al. | 382/56 |
| 4,860,355 | 8/1989 | Copperi | 381/36 |
| 4,878,230 | 10/1989 | Murakami et al. | 375/27 |
| 4,958,225 | 9/1990 | Bi et al. | 358/133 |
| 4,972,483 | 11/1990 | Carey | 381/31 |
| 5,021,971 | 6/1991 | Lindsay | 348/422 |
| 5,172,228 | 12/1992 | Israelsen | 348/422 |

OTHER PUBLICATIONS

Madisetti et al "A Radius Bucketing Approach to Fast Vector Quantization Encoding", 1989 IEEE pp. 1767–1770.
Kamel et al "Fast Neighbor Search for Vector Quantization of Image Data" 1992 IEEE pp. 623–626.
Heonchul Park et al., "An Architecture for Tree Search Based Vector Quantization for Single Chip Implementation," *Conference for Application Specific Array Processors,* Aug. 4, 1992.
R. Dianysian and R. Baker, "A VLSI Chip Set for Real Time Vector Quantization of Image Sequences," *Proc. IEEE Inter. Symp. Circuits and Systems,* pp. 221–224, May 1987.
W-C Fang, C-Y. Chang, and B. J. Sheu, "Systolic Tree-Searched Vector Quantizer for Real-Time Image Compression," *IEEE Workshop for VLSI Signal Processing,* pp. 352–361, 1990.
R. Kolagotla, S-S. Yu, and J. F. Já Já, "VLSI Implementation of a Tree Searched Vector Quantizer," *Manuscript,* Univ. of Maryland, 1990.
P. A. Ramamoorthy, B. Potu, and T. Trans, "Bit–Serial VLSI Implementation of Vector Quantizer for Real–Time Image Coding," *IEEE Trans. on Circuits and Systems,* vol. 36, No. 10, pp. 1281–1290, Oct. 1989.

*Primary Examiner*—Joseph Mancuso
*Assistant Examiner*—Gerard Del Rosso
*Attorney, Agent, or Firm*—Poms, Smith, Lande & Rose

[57] ABSTRACT

Video data compression techniques reduce necessary storage size and communication channel bandwidth while maintaining acceptable fidelity. Vector quantization provides better overall data compression performance by coding vectors instead of scalars. The search algorithm and VLSI architecture for implementing it is herein disclosed, and such a search algorithm is useful for real-time image processing. The architecture employs a single processing element and external memory for storing the N constant value hyperplanes used in the search, where N is the number of codevectors. The design does not perform any multiplication operation using the constant value hyperplane tree search, since the tree search method is independent of any $L_q$ metric for q between one and infinity. Memory used by the design is significantly less than memory employed in existing architecture.

20 Claims, 5 Drawing Sheets

TREE

MEMORY

SINGLE CHIP DESIGN FOR FAST IMAGE COMPRESSION

FIELD OF THE INVENTION

This invention relates to encoding video data for high speed transmission, and more particularly to efficiently organizing, compressing, and transmitting vectors representing a video image.

BACKGROUND OF THE INVENTION

As more and more information is being stored and transmitted through computers, satellites, faxes, and other electronic media, the need for highly efficient means of data compression has arisen.

When compressing digital data that was converted from an analog source, such as sound or images, exact mapping of the source data is not required provided that the resulting data has a high quality and fidelity. A higher level of compression results from a slight loss of information.

Vector quantizers have been successfully employed to compress digital data. A vector quantizer for compressing video images divides the image into multiple small blocks, or pixels. Pixels are small subdivisions of the initial image, and thus a picture may be divided into 1000 rows and 1000 columns for a total of 100,000 pixels, for example. Pixels may be grouped together to form a subsection of the picture, and each such subsection would constitute a vector. For example, if a 10×10 subsection were employed, a 100 pixel vector would be the input vector to be quantized. The circuit of the present invention operates on these vectors, and the quality of the picture reproduced after being received is directly related to the size of the vector used. The larger the subsection of an image being represented by a vector of a given complexity, the lower the quality of the picture available when the picture is received.

Pictures transmitted using the prior art and the present invention have been in black and white, but color pictures may be transmitted if vectorized into red, green, and blue components of varying intensity or converted into luminance and chrominance.

Before the input vectors can be quantized, a set of vectors must be established which most closely approximate the range of vectors comprising the pictures transmitted. Such a group of vectors is called a "codebook" or a set of "codevectors." One codevector may be a set of all white pixels, while another may be all black pixels, and a third codevector may have the top half of the subsection white and the bottom half black. May other variations are possible. The quantizer stores a sufficient array of codevectors in the codebook such that a close match between the vectors in the image and the codebook is attained.

The image may be reproduced by a system receiving the codebook and the set of indices corresponding to the closest codevector to the input vector. Reproduction of the image consists of replacing each index with the associated codebook vector. The reproduced image does not exactly match the original image because the codebook vectors may differ from the input vectors. The measure of the difference between the codebook vector and the input vector is called the distortion. Distortion may be decreased by using a larger codebook or smaller codebook vectors.

The complexity of the encoding system becomes a major factor in coding data at a low bit rate with an acceptable level of distortion Most implementations of vector quantization have been limited to speech coding since image coding requires much higher throughput rate. Previous solutions, employing one dimensional and two dimensional arrays, result in multiple chips since the implementations require a large number of processing elements. In addition, such implementations also need large input/output bandwidth with the host.

Prior tree search based architectures employ (log N) processing elements and (kN) memory, where N is the number of codevectors and k is the dimension of the codevectors. Each processing element has a pipelined multiplier to compute the $L_2$ metric (Euclidean distance between vectors). For example, the design in Kolagotla et al., "VLSI Implementation of a Tree Searched Vector Quantizer," *Manuscript*, University of Maryland, 1990 has external memory to allow processing elements to be modular, while the design in W. C. Fang, et al., "Systolic Tree-Searched Vector Quantizer for Real-Time Image Compression," *IEEE Workshop for VLSI Signal Processing*, p. 352–361, 1990, has local memory within each processing element to support fast access. The major deficiency of these designs is that they cannot handle large codebooks efficiently; both designs require large I/O bandwidth, and the design in Fang requires large on-chip memory (local memory) in the processing element. Each processing element requires a different amount of memory which increases exponentially, since each level of the tree is mapped onto a processing element. Thus, these designs require multiple chips for large numbers of codevectors, N.

The design presented in Bi, et al., U.S. Pat. No. 4,958,225, is for a tree search algorithm which utilizes hyperplanes to partition the training vectors. For three dimensional arrays in three dimensional space, two dimensional planes may be employed to divide the arrays. For higher dimensional space, the higher dimensional arrays are divided by "hyperplanes," or multi-dimensional planes The Bi design requires computing distances between the input vector and the reference codebook vector in determining the proper hyperplane to partition the vectors, thus making the device computationally expensive and requiring several multiplication operations and multiple processing elements. Additionally, a high level of memory is required to store the hyperplane values and the overall bandwidth is high.

There is no known single processing element implementation in the prior art which can operate at a video rate. A fast tree search based vector quantization algorithm is required to achieve a single processing element implementation at a video rate. Also, intensive multiplication operations which compute the Euclidean distance should be eliminated wherever possible in the search, since multipliers result in high processing element area complexity.

Digital image data transmission of 512×512 images with 8 bits per pixel at 30 frames per second requires 63 megabits per second bandwidth without data compression. If vector quantization at 0.5 bit/pixel bit rate is employed, a communication channel bandwidth of 3.9 megabits per second would adequately transmit the image with little distortion. For this spatial domain picture coding, input vectors of size ranging from 16 to 36 have been employed. Each word has up to 12 bits. For coding TV signals using 512×480 images, the available time for processing the input vectors with k=16 is 1.184 μs (microseconds) and it increases to 2.368 μs with k=32.

Assuming a rate of r=0.5 bit/pixel, k=32, and 512×512 images with 8 bits/pixel at 30 frames per second are employed, data compression requires $N=2^{rk}=2^{16}$ codevectors. Assuming full search is employed, the number of processing elements needed for real-time operations is $2^{21}$. The number of multiplication operations needed for an input vector is $2^{21}$. The resulting architecture must handle $2^{34}$ multiplication operations per frame. Any single processing element implementation cannot perform full search in real-time for the above image data.

For the same image data, the number of processing elements used in prior tree search is 16, and the number of multiplications needed for an input vector is 512. The total number of multiplications per frame is 223, which results in over 240 MOPS (Million Operations Per Second). The ith processing element has memory size of $32 \times 2^i$ words, where $0 \leq i \leq 15$, in the prior art tree search architectures. If a single chip implementation is desired, the total size of the on-chip memory will be $k \times N = 2^{21}$ words, which is currently infeasible to implement.

Also, if off-chip memory is employed, implementation would require more than 136 I/O pins for data communications alone, assuming that each element of the vector is represented by 8 bits. Thus, known tree search algorithms, which result in multiple chips, are not suitable for a single processing element implementation.

In image processing applications, higher computational requirements arise in order to achieve desired performance with vector quantization. The available time for encoding an input vector increases as the dimension of the codevectors increases, assuming a source with fixed scalar throughput rate.

It is therefore one object of the present invention to establish a new tree search algorithm having less computational complexity for a single processing element implementation such that the processing element can operate at input data rate.

It is a further object of the present invention to provide a video image reproduction device which can be implemented using a single VLSI (Very Large Scale Integration) chip.

It is another object of this invention to utilize significantly less memory to store the search information compared with conventional search algorithms for vector quantization.

It is a further object of this invention to provide hardware architecture suitable for VLSI implementation based on the proposed tree search.

SUMMARY OF THE INVENTION

The present invention involves tree search circuitry for vector quantization (VQ) using a clustering technique and operating on a single VLSI chip. The search takes (log N) time on a sequential machine to map an input vector to an index, assuming unit time corresponds to one addition operation and the input vector is available in the memory. Prior art proposals assume unit time to correspond to a multiplication operation. The proposed search does not require any multiplication operation.

The clustering circuitry of the present invention employs a multidimensional tree search method and combines two nearer codevectors into a new codevector in each iteration. Such a codevector computation lowers the time complexity of the processing element of the circuit.

One aspect of the invention involves compressing data in the form of multiple input vectors into a set of identification indices and a set of codebook vectors, where the codebook is computed by selecting a set of training vectors, defining a box containing all training vectors, recursively splitting the box using a constant value hyperplane into two subboxes with each subbox containing an equal number of training vectors until a desired number of subboxes is obtained, determining a centroid of each subbox, and assigning a codevector to each centroid.

The codebook of codevectors is assembled within the circuit using a clustering technique. Clustering is to partition a given set of training vectors in k-dimensional space into N clusters so that vectors within each cluster are near to each other. Each cluster is represented by a vector which is the center of the cluster, or centroid.

The LBG clustering method for deriving a codebook using a set of training vectors is iterative. The LBG method is named after Y. Linde, A. Buzo, and R. M. Gray, and is also known as Lloyd's generalized algorithm. After choosing an initial codebook (which can be arbitrary or can be a previously used one), iteration begins assigning each training vector to its codevector which satisfies a given distortion measure using full search. The codevectors are then modified to minimize the error between the codevectors and the training vectors.

The clustering circuitry of the present invention employs the "Box/Split" analysis which uses a multidimensional tree search method and thus operates faster than the traditional LBG method. The basic idea of clustering assumes a box in k dimensional space containing all the data in a training set. Using box/split, a chosen k dimensional "box" is split into two boxes using a hyperplane which is perpendicular to the longest interval of the initial box. If this hyperplane splits a box in two, these two boxes are successors of the original box.

In the present invention, the box to be split is chosen such that it is one of the two boxes among the boxes whose mutual distance is the largest and has larger volume, which is determined using a "farthest pair" algorithm. A box is split using a hyperplane, or a plane having the same number of dimensions, or elements, as the total vector space. Each hyperplane employed in the proposed search can be represented by a constant vector value, i.e. $x_i = c$. A predetermined number of shrunken boxes whose union is equal to the entire space are computed within the circuit, where a shrunken box is a box which contains the data in the training set rather than an unshrunken box, which contains the full space. The center of each shrunken box becomes a codevector for VQ, or a centroid.

Employing the hyperplanes used to split the boxes, a number of unshrunken boxes are obtained such that each unshrunken box contains the shrunken box and there is no training vector in the intersection of the unshrunken box and the shrunken box. The total volume of the unshrunken boxes is equal to that of the search space, and a codevector is chosen from each box.

The present design using the Box/Split algorithm is suitable for single chip implementation in current VLSI technology. The architecture consists of an external memory module, a memory index register, and a processing element. Hyperplane information is located in the external memory module. The codebook is stored externally, since vector quantization schemes may require more than one codebook or require change of codebook during computation. The memory index register stores the address of the location to be accessed in the external memory module using the result of the comparison in the processing element. At the end of the tree search, the memory index register also contains the index corresponding to each input vector.

The present invention thus utilizes a single processing element and (N) external memory. Compared with known architectures, the present invention has a simple processing element structure.

Other objects, features, and advantages of the present invention will become more apparent from a consideration of the following detailed description and from the accompanying drawings.

DESCRIPTION OF THE PREFERRED EMBODIMENT

Figure 1:
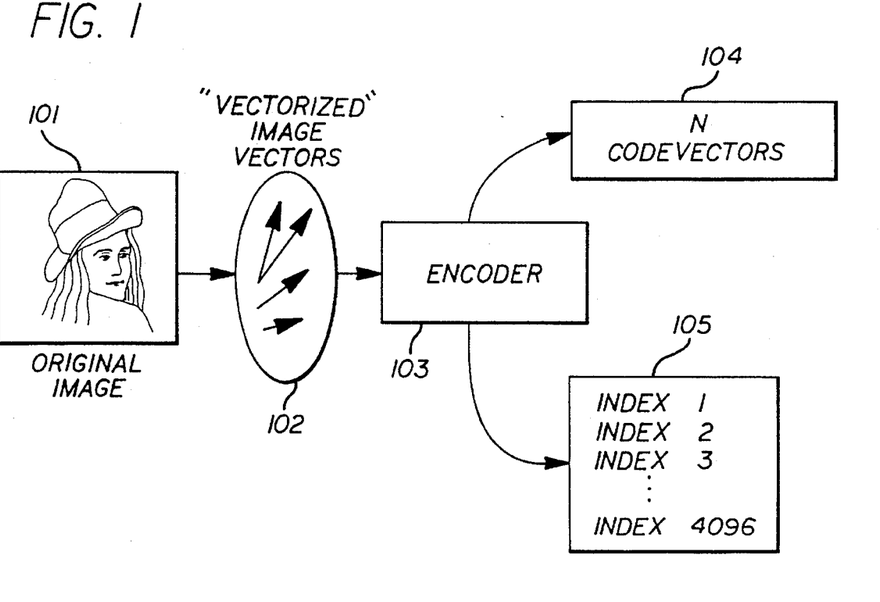
FIG. 1 illustrates compression of an image into a codebook of codevectors and a set of indices.

FIG. 1 shows the method by which the original image is converted into the codebook of codevectors 104 and the vector of indices 105. Initially the original image is vectorized, or divided into a series of image vectors of a particular dimension. For the present implementation, the image vectors represent the set of pixels in a 4×4, or 16 element, subsection of the original image 101. These vectorized image vectors 102 are transferred to the encoder 103 which determines the best set of codevectors to represent the original image 101 and matches the vectorized image vectors with the closest codevector. The index of the codevector closest to a vectorized image vector is then determined. The vector of indices 105 relating the original image 101 to the codevectors is then transmitted.

Figure 2:
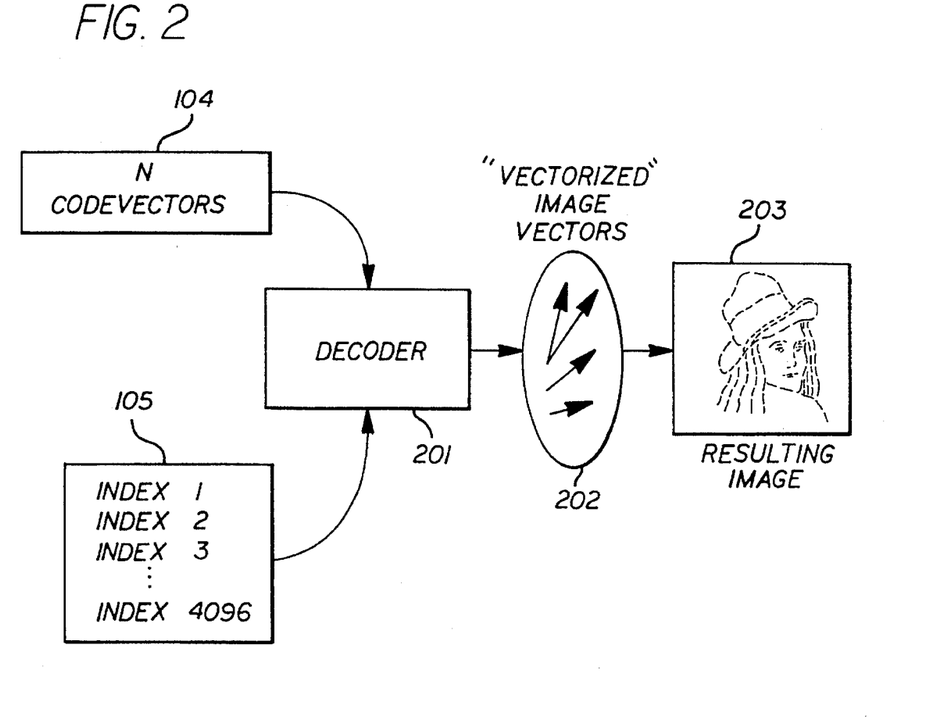
FIG. 2 illustrates decompression of a codebook of codevectors and a set of indices into an image.

FIG. 2 illustrates the method where the codebook of codevectors 104 and the vector of indices 105 yield a resulting image 203. The codebook of codevectors 104 and the vector of indices 105 are transmitted to the decoder 201 which rebuilds the second set of vectorized image vectors 202. These vectorized image vectors are only an approximation of the original image unless the size of the vectorized image vector is a single pixel. Thus, while a loss of fidelity occurs in decoding the image into the second set of vectorized image vectors 202, such a loss of fidelity may not be realized by the viewer. The second set of vectorized image vectors 202 are then ordered into the resulting image 203.

Figure 3:
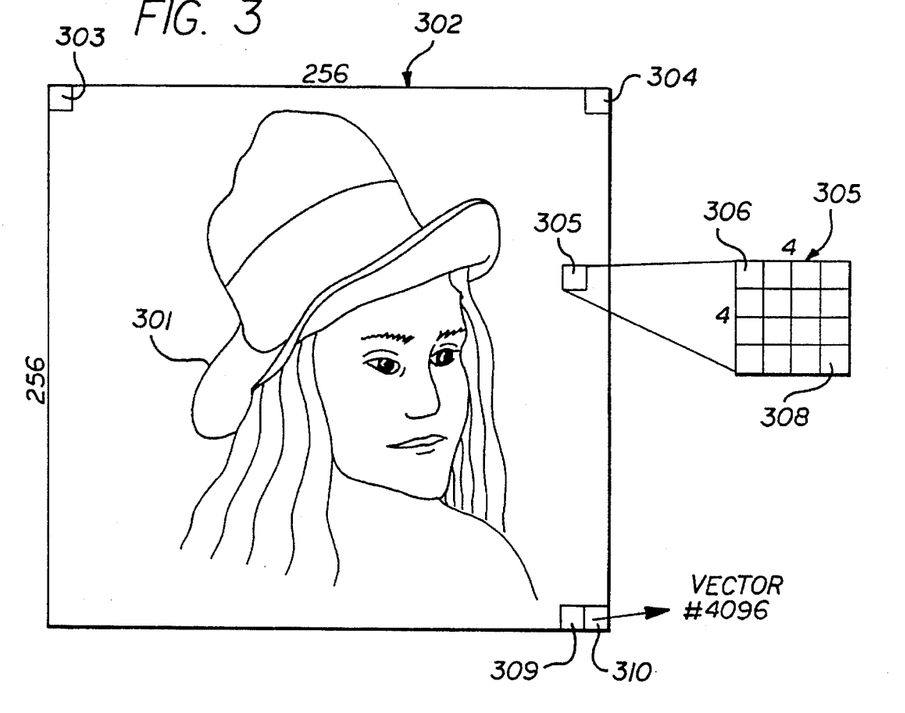
FIG. 3 represents partitioning of an input space.

FIG. 3 represents how an image array 302 is decomposed into a set of pixels and vectors which can then be quantized and transmitted. Image array 302 contains the original image 401 represented by multiple individual pixels. In practice, image array 302 is 1024 pixels high ×1024 pixels wide. A 4×4 square of 16 pixels is used to make up a vector, known as an input vector. Thus the image array 302 can be divided into many input vectors. In practice, 4096 input vectors have been used, divided into 256 rows and 256 columns. The first row of 256 input vectors consists of first row initial vector 303 and first row terminal vector 304. Representative input vector 305 illustrates the individual pixels in a vector, including initial pixel 306 and final pixel 308. The size of the codebook N is determined by the bit-rate r and the dimension of the vectors k, where $r=(\lceil \log_2 N \rceil/k)$ bits/sample, $0<r<1$. In practice, k and N up to 64 and 4096, respectively, have been employed.

Figure 4:
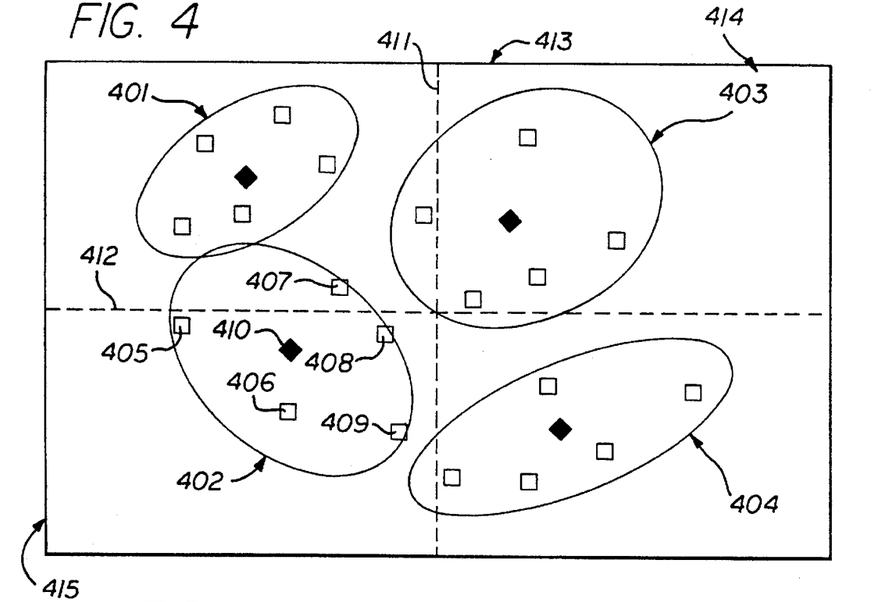
FIG. 4 illustrates the components used to vectorize the original image.

FIG. 4 graphically illustrates vector quantization. Vector quantization decomposes the input into vectors. The index of the nearest codevector in the codebook based on a given distortion measure is transmitted. This index is used to identify the input vector at the decoder. The procedure is repeated for successive input vectors.

Figure 5:
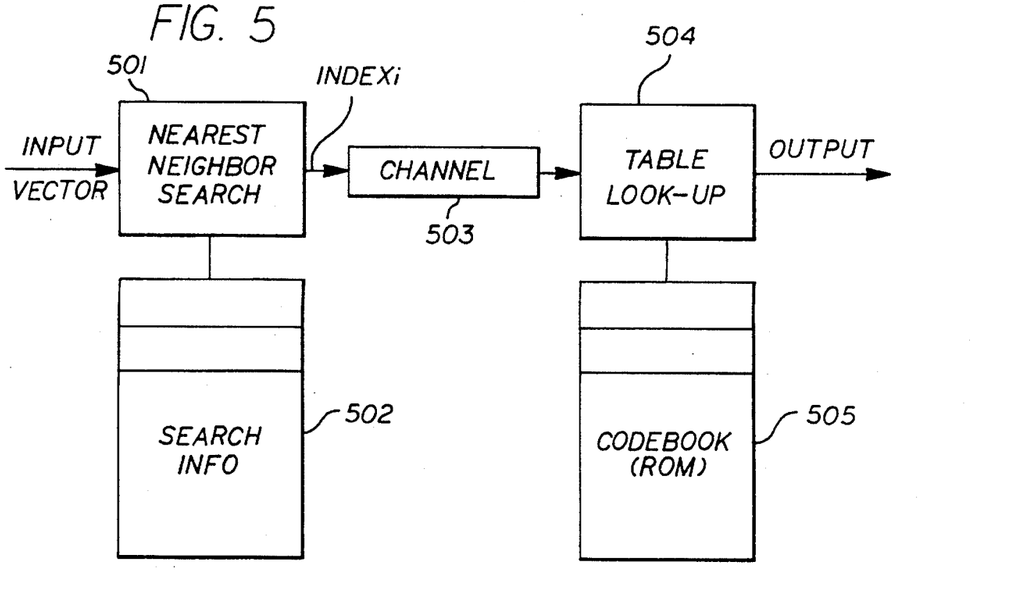
FIG. 5 is a block diagram of both the transmitting and receiving components of a vector quantizer.

After the codebook of codevectors has been calculated, the input vectors are quantized as shown in FIG. 5. The nearest neighbor search mechanism 501 receives the set of input vectors and calculates the codevector closest to the individual input vector based on the hyperplane information stored in the search information memory 502. The nearest neighbor search mechanism determines the index of the closest codevector and transmits the index across a transmission channel 503. At the receiver, table look-up mechanism 504 (which takes one clock cycle) is used to identify the codevector using codebook data contained in the codebook memory 505.

The codebooks are designed using a clustering technique as illustrated in FIG. 4. Clustering is to partition input vectors 405–409 into N clusters 401–404, so that input vectors 405–409 within each cluster 401–404 are near to each other. Each cluster is represented by a codevector which is the center of the cluster, or centroid 410. Clustering minimizes the maximum distance between the input vectors 405–409 in each cluster 401–404 and the centroid 410 for a given $L_q$ metric, $1 \leq q \leq \infty$.

The vector quantization of FIG. 4 compares input vectors 405–409 with codevectors or hyperplanes 411 and 412, where a hyperplane is a subspace of $R^k$ of dimension $k-1$. Alternately, a hyperplane is a set of points, x satisfying $a_1 x_1 + a_2 x_2 + \ldots + a_k x_k = b$, (with not all a's equal to zero) associated with the codevectors. The index of the nearest codevector to the input vectors 405–409, or centroid 410, is transmitted. The vector of indices 105 are used to recover the input pixels using the codebook of codevectors 104 at the decoder 201.

Two main search techniques have been used to map input vectors 405–409 to the index of a codevector in the codebook 505; full search and tree search. Full search compares input vectors 405–409 with each centroid 410 and matches a input vector to the nearest (minimum distance) centroid 410. Tree search performs a limited search by employing a binary tree data structure. On a sequential machine, the time complexity of the full search is (kN) and that of the tree search is (k log N), where N is the number of codevectors and k is the number of dimensions in the codevectors, assuming unit time corresponds to a multiplication. The recovered image encoded by the tree search is generally competitive with the one encoded by the full search.

Clustering algorithms generate the codebook 505 for VQ. The LBG clustering algorithm is one method for generating a codebook. The LBG clustering algorithm iteratively derives a codebook using a set of training vectors. After choosing an initial codebook of training vectors (which can be arbitrary or can be a previously used one), iteration begins assigning each training vector to its codevector which satisfies a given distortion measure using full search. The codevectors are then modified to minimize the error between the codevectors and the training vectors, where the time complexity is (MN) on a sequential machine where M is the number of training vectors and N is the number of codevectors.

The clustering algorithm of the present invention employs a multidimensional tree search method.

---
Algorithm 1: Clustering algorithm
---
B ← {box(S)};
repeat
  pick a box b from B;
  choose disjoint boxes $b_1$ and $b_2$ in b satisfying certain constraints;
  B ← (B − {b}) ∪ {shrunk ($b_1$), shrunk ($b_2$)};
until |B| = N.
---

Algorithm 1 shows the basic idea of clustering. Let $b = J_1 \times J_2 \times \ldots \times J_k$, where each $J_i$ is an interval, denote a box in k dimensional space. Let box(S) be the box containing all the data in the training set S. shrunk(b) denotes the smallest box containing the training vectors in b∩S. In Algorithm 1, a box b 413 is split into two boxes, $b_1$ 414 and $b_2$ 415 using a hyperplane 411 which is perpendicular to the longest interval of box b 413. If the first dimension of box b 413 $[h_{1L}, h_{1H}] \times [h_{2L}, h_{2H}] \times \ldots \times [h_{kL}, h_{kH})$ has the longest interval, then the bisecting simple hyperplane for the box is $x_1 = (h_{1H} - h_{1L})/2 + h_{1L}$. Successors of this box are $[h_{1L}, x1) \times [h_{2L}, h_{2H}] \times \ldots \times [h_{kL}, h_{kH})$ and $[x_1, h_{1H}) \times [h_{2L}, h_{2H}] \times \ldots \times [h_{kL}, h_{kH})$.

The box to be split is chosen such that it is one of the two boxes among the set of boxes in the k dimensional space whose mutual distance is the largest and has larger volume. The largest distance and largest volume are computed using a "farthest pair" algorithm. The farthest pair algorithm solves the problem defined as follows: for a given set of N points in $R^k$, find a pair of points whose distance is maximum among all the $(N^2)$ possible pairs. Finally, N shrunken boxes whose union is equal to S are computed, where N is the desired number of codevectors. The center of each box becomes a codevector for VQ, or a centroid 410.

Modification of Algorithm 1 yields N k-dimensional unshrunken boxes using the hyperplanes 411 and 412 used to split the boxes. At the end of algorithm, N unshrunken boxes are obtained such that each unshrunken box contains the shrunken box and there is no training vector in the intersection of the unshrunken box and the shrunken box. The total volume of the N unshrunken boxes is equal to that of the search space in $R^k$. A codevector or centroid 410 is chosen from each box.

Due to the constant value box decomposition scheme employed, hyperplanes 411 and 412 employed in the search can be represented as $x_i = c$. The total number of hyperplanes employed to generate the boxes is at most N. The proposed search does not compute any $L_q$ metric, since given hyperplanes 411 and 412 the search only checks if the ith element of the input vector is greater than or equal to the constant c.

Based on algorithms for the "farthest pair" problem and box decomposition, clustering can be done in (M log N) time on a sequential machine, where M is the number of training vectors in $R^k$ and N is the number of codevectors.

Figure 6:
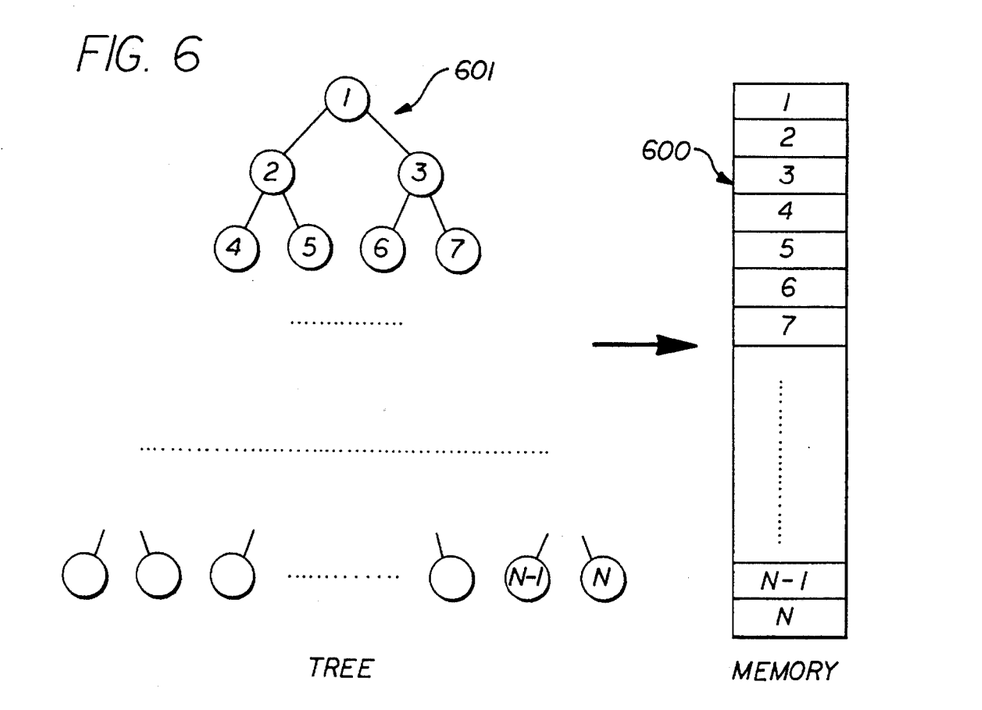
FIG. 6 illustrates a mapping of the search tree generated by the system into memory.

FIG. 6 illustrates the tree created by the search algorithm and the mapping of the tree into memory. A binary tree 601 of height (log N) to search for a codevector can be easily constructed during the clustering procedure. Initially, we have an unshrunken box containing all the training vectors which cover the complete search space. By splitting the training vectors using a simple hyperplane, the root of the tree 601 has two children. The simple hyperplane information used to split the training vectors is stored at the root. The left (or right) child has all the vectors such that the value in the dimension corresponding to the index of the simple hyperplane has less than (or greater than or equal to) the constant associated with the hyperplane. This idea is recursively applied until the tree 601 has the desired number of leaves.

When an input vector arrives at a node of the tree 601, the input element corresponding to the index of the hyperplane stored at the node is compared with the constant corresponding to the hyperplane. The node outputs a "0" or "1" based on the result of the comparison. The path from the root to the leaf node becomes the index of the codevector corresponding to an input vector.

The search can be performed in (log N) time units on a sequential machine, since the tree 601 has height (log N), assuming the input vector is available in the memory. (N) memory is sufficient to implement the search algorithm, since each node has two words of data associated with it and the total number of nodes in the tree 601 is (N). The result of the search, which is a path in the tree 601, is the index of the desired codevector. Since each node in the tree 601 compares a constant c with an element of the input vector, multiplication operation is not required for any $L_q$ metric, $1 \leq q \leq \infty$.

The computational requirement of the present search method is independent of the dimensionality of the input vectors. For a given S×T image, known tree search algorithms require $$\left( \frac{ST}{k} \times k \log N \right) = (STrk)$$

operations, where $N = 2^{rk}$, $0 < r < 1$. The present search algorithm requires O(ST) operations, since max(k, log N) is k in this case.

Assuming that the search tree 601 has exactly log N levels, numbered 0 to log N −1, the present design can be implemented using current VLSI technology. k is necessarily greater than log N, since $N = 2^{rk}$ and $0 < r < 1$.

Figure 7:
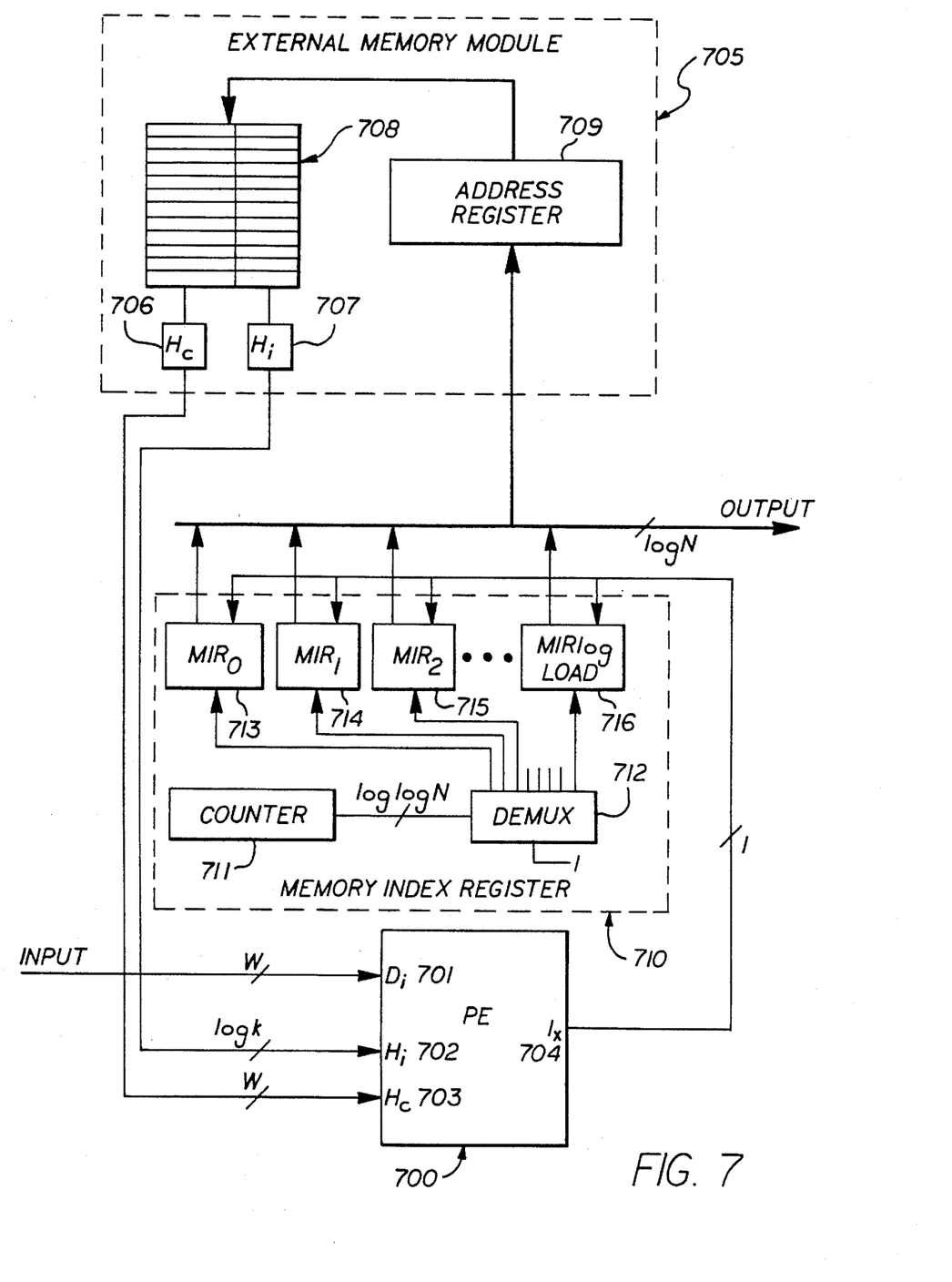
FIG. 7 illustrates the VLSI mechanization of the present invention.

The organization of the proposed architecture is shown in FIG. 7. The architecture consists of an external memory module 705, a memory index register (MIR) 710, and a processing element 700. Information about the hyperplanes used in the search is contained in the external memory module 705. The codebook is stored externally, since some vector quantization schemes need more than one codebook or require change of codebook during computation. MIR 710 stores the address of the location to be accessed in the address register 709 in the external memory module 705 using the result of the comparison in the processing element 700. At the end of the tree search, the external memory module 705 also contains the index corresponding to the input vector.

The hyperplane index and the constant corresponding to the jth node (from the left) in the ith level of the tree is stored in the $(2^i + j)$th location in the external memory module 705, $0 \leq i \leq \log N - 1$, $0 \leq j \leq 2^i - 1$. The left (right) child of a node can be obtained by adding 0 ( or 1) to the left shifted node index. Thus, the path from the root of the tree 601 to a node corresponds to the binary representation of the index of the node. Each location occupies (w+log k) bits, w bits for the hyperplane constant and log k bits for the hyperplane index.

Data is loaded into the registers 708 at the beginning of a clock cycle and the loaded data is available during the same cycle. A two phase clock, where phases are denoted $\phi_1$, $\phi_2$, can be used to achieve this timing sequence.

The processing element has the following data ports: an input data channel $D_i$ 701, an index channel $I_x$ 704, a hyperplane constant data channel $H_c$ 703, and a hyperplane index data channel $H_i$ 702. Input data channel $D_i$ 701 and hyperplane constant data channel $H_c$ 703 are w bits wide, where $8 \leq w \leq 12$. Hyperplane constant data channel $H_i$ 702 is log k bits wide. Index channel $I_x$ is one-bit wide. Computation begins at t=0 and a window denotes a block of k cycles starting at time ik, i=0, 1, . . . ..

External memory module 705 consists of address register 709, hyperplane data storage register 708, hyperplane constant register 706 and hyperplane index register 707. Hyperplane constant register 706 and hyperplane index register 707 retrieve hyperplane constant and hyperplane index data from addresses in hyperplane data storage register 708 and transmit the data to the processing element 700.

MIR 710 receives the index from processing element 700 and loads the index into MIR load registers 713–716. Demultiplexer 712 operates on data from counter 711 to shift the index data contained in MIR load registers 713–716 to transmit the index out of the structure.

Figure 8:
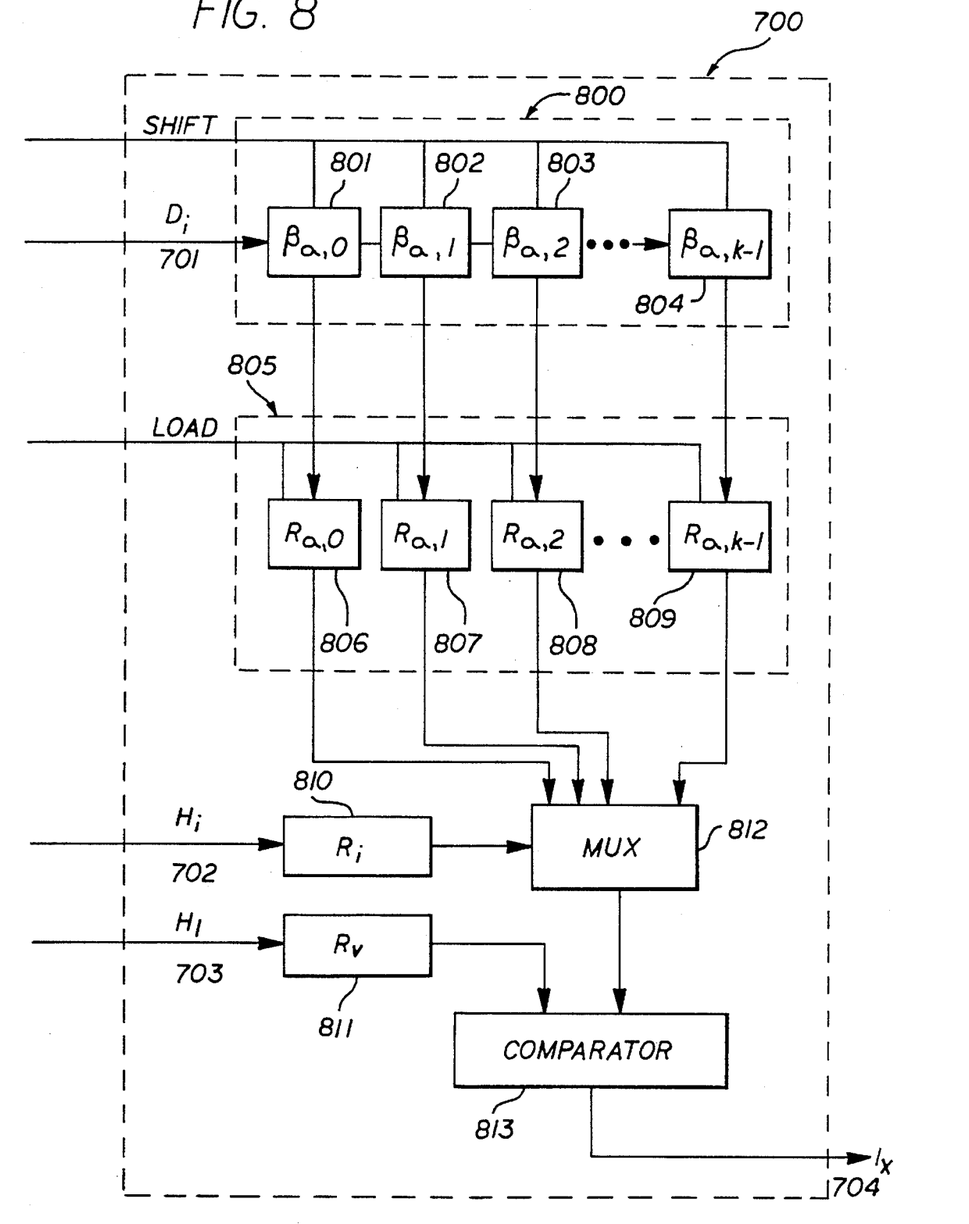
FIG. 8 illustrates the architecture of the processing element of the VLSI mechanization of the present invention.

Internal structure of the processing element 700 is shown in FIG. 8. An element of the input vector is fed into the processing element 700 every cycle. Processing element 700 receives input data through input data channel $D_i$ 701, hyperplane data through hyperplane index channel $H_i$ 702 and hyperplane constant channel $H_c$ 703. Data buffer $B_d$ 800 receives the input data and divides the data into k data registers 801–804 acting as a word level shift register. Load shift register $R_d$ 805 consists of k load registers 806–89 which operate on the input vector data received from data buffer $B_d$ 800. Load shift register $R_d$ 805 stores the input to be used for comparison during log N cycles over a window. Constant register $R_v$ 811 stores hyperplane constant data from $H_c$ 703, and index register $R_i$ 810 stores the hyperplane index data from $H_i$ 702. Multiplexer 812 receives data from index register $R_i$ 810 and load shift register $R_d$ 805 and outputs input vector data based on a comparison with a particular hyperplane to the comparator 813. Comparator 813 compares the input vector data with the hyperplane received from constant register $R_v$ 811 and input vector data from multiplexer 812 to determine the index transmitted to MIR 710.

The operation of the processing element is shown in Algorithm 2. Note that these operations are performed over k cycles.

---
Algorithm 2: Operation of the processing element
---

```
for j = 0 to k – 1
  begin
    Right shift B_d and B_d[0] ← D_i;  //use leading edge of φ_1
    if j ≤ log N then
    begin
      Left shift MIR;
      Compare R_d[R_i] and R_v, and store into LSB or MIR;
        //using leading edge of φ_2
    end
    if j = k – 1
    begin
      R_d[0:k – 1] ← B_d[0:k – 1]; //use leading edge of φ_2
      MIR ← 1; j ← 0;
    end
end
```

During the jth cycle of a window, $0 \leq j \leq \log N-1$, the processing element fetches the hyperplane information from the external memory through $H_c$ 703 and $H_i$ 702, and compares an element of the input vector and the hyperplane constant. The processing element outputs the result of the comparison onto $I_x$ 704. This one bit signal is loaded into the Least Significant Bit (LSB) of MIR 710. The contents of MIR 710 is used to fetch the data corresponding to the next level of the tree. During the (log N)th cycle of each window, the output is available in MIR. During the last cycle of each window, MIR is set to "1" to access the root of the search tree for the next input vector.

The throughput rate of the design is 1/k, since an index corresponding to an input vector is output every k cycles after the array is filled. The latency of the array is k+log N time unit. For an image of 512×512 pixels/frame with 8 bits/pixel at 30 frames/sec, the search algorithm requires less than 8 MOPS. The architecture can operate at input data rate in real-time, since present VLSI hardware can support over 20 MOPS.

Estimate of the die size of the chip (including the processing element 700 and MIR 710) in the above architecture was performed using layout tools. Standard cell approach was used to generate a layout, assuming k=16, $N=2^{12}$ and w=8. The die size was 2.2 mm×3.3 mm using 1.2μ CMOS technology. Most silicon area is consumed by the registers and connection wire. The longest path in the design was from $R_d$ 805 to the comparator 813, where delay time of less than 25 ns using SPICE simulation may be achieved. The number of I/O pins is 40 including signal and power ports. The number of I/O pins can be reduced into 28 by using an off-chip MIR 710. Table 1 shows a comparison of the features of the proposed architecture with those of the known architectures.

| Designs in | No. of PEs | Multiplication Operation | Complexity of a PE | Memory Size | I/O Bandwidth |
|---|---|---|---|---|---|
| W.C. Fang et al. | log N | Yes | High | kN | $w \log N + \log^2 N$ |
| Kolagotla et al. | log N | Yes | High | kN | $w \log N + \log^2 N$ |
| This invention | 1 | No | Low | N | $2w + \log k + \log N$ |

The invention may have many applications in addition to quantization of image vectors, including pattern recognition scenarios where the pattern may be a voice command, an image, or an electromagnetic signature of an enemy aircraft. Generally, an input element is compared to a set of reference elements for the purpose of identifying the closest reference element to the input, based on a distortion measure.

While the invention has been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. An apparatus for compressing data in the form of a plurality of input vectors into a set of identification indices associated with a set of codebook vectors, said apparatus comprising:
   a. means for receiving the plurality of input vectors;
   b. search means connected to the means for receiving the plurality of input vectors, wherein said search means consist of:
      (1) means for selecting a set of training vectors;
      (2) means for defining an n-dimensional box containing all training vectors, wherein n represents codebook vector dimension;
      (3) means for recursively splitting the n-dimensional box using a constant value hyperplane into two subboxes, wherein each subbox contains an equal number of training vectors, until a predetermined number of subboxes is obtained;
      (4) means for determining a centroid of each subbox; and
      (5) means for assigning a codevector to each centroid;
   c. means for storing the set of codebook vectors and the set of constant value hyperplanes;
   d. means for searching the set of codebook vectors and matching the plurality of input vectors to the set of codebook vectors using the constant value hyperplanes and assigning an identification index to each input vector based on the closest codebook vector; and
   e. means for transmitting the set of identification indices and the set of codebook vectors.

2. The apparatus for compressing data of claim 1, wherein means for storing the set of codebook vectors and the set of constant value hyperplanes is an external memory module circuit and a memory index register circuit.

3. An apparatus for compressing data in the form of a plurality of input vectors into a set of identification indices associated with a set of codebook vectors, said apparatus comprising:
   (a) means for calculating the set of codebook vectors and a set of constant value hyperplanes using a set of training vectors comprising:
      (1) means for defining an n-dimensional box containing a set of training vectors;
      (2) means for repeatedly dividing the n-dimensional box into a set of n-dimensional subboxes containing an equal number of training vectors by using constant value hyperplanes; and
      3) means for selecting a center point of each subbox and assigning a codebook vector to said center point;
   (b) means for storing the set of codebook vectors and the set of constant value hyperplanes;
   (c) means for receiving the plurality of input vectors;
   (d) means for searching the set of codebook vectors and matching the plurality of input vectors to the set of codebook vectors using the constant value hyperplanes and assigning an identification index to each input vector based on a closest codebook vector; and
   (e) means for transmitting the set of identification indices.

4. The apparatus for compressing data of claim 3, wherein means for repeatedly dividing the n-dimensional box into a set of n-dimensional subboxes containing an equal number of training vectors by using constant value hyperplanes consists of dividing the n-dimensional box and subboxes so that each subbox contains an equal number of training vectors and the constant value hyperplane divides the n-dimensional box or subbox along its longest dimension.

5. The apparatus for compressing data of claim 4, wherein means for storing the set of constant value hyperplanes is an external memory module circuit and a memory index register circuit.

6. The apparatus for compressing data of claim 3, wherein means for calculating the set of codebook vectors and set of constant value hyperplanes consists of:
   (a) means for calculating a constant value hyperplane which partitions the set of training vectors, said constant value hyperplane having the form:

$$\sum_{i=1}^{n} a_i x_i = c$$

(b) means for determining whether one of the training vectors is on One side of the constant value hyperplane;
   (c) means for recursively calculating constant value hyperplanes until a predetermined number of constant value hyperplanes is selected; and
   (d) means for determining a centroid of the training vectors bounded by the constant value hyperplanes and assigning a codevector to said centroid.

7. The apparatus for compressing data of claim 6, wherein the means for calculating the constant value hyperplane which partitions the set of training vectors consists of:
   (a) means for creating an n-dimensional box containing the set of training vectors wherein n represents codebook dimension;
   (b) means for calculating the constant value hyperplane along a longest dimension of said n-dimensional box such that the n-dimensional box is split into two n-dimensional boxes, wherein each subbox contains an equal number of training vectors.

8. An apparatus for compressing data in the form of an input vector into an identification code of one of a set of codebook vectors, said apparatus comprising:
   (a) means for receiving the input vector and the set of codebook vectors;
   (b) means for storing the input vector and set of codebook vectors;
   (c) means for selecting a set of codebook vectors by altering a set of training vectors, wherein said means for selecting the set of codebook vectors consist of using a set of constant value hyperplanes to divide the set of training vectors into n-dimensional boxes containing equal numbers of training vectors, comprising:.
      (1) means for defining an n-dimensional box containing a set of training vectors;
      (2) means for repeatedly dividing the n-dimensional box into a set of n dimensional subboxes containing an equal number of training vectors by using constant value hyperplanes; and (3) means for selecting a center point of each subbox and assigning a codebook vector to said center point;

(d) means for assigning an identification code to each of the set of codebook vectors; and (e) means for generating an output signal, said output signal representative of the identification code of the closely matching codebook vector.

9. The apparatus for compressing data of claim 8, wherein means for repeatedly dividing the n-dimensional box into a set of n-dimensional subboxes containing an equal number of training vectors by using constant value hyperplanes consists of dividing the n-dimensional box and subboxes so that each subbox contains an equal number of training vectors and the constant value hyperplane divides the n-dimensional box or subbox along its longest dimension.

10. A circuit for performing a fast search of a codebook of codevectors, the circuit comprising:

(a) a processing element which utilizes a tree search to form a search tree which determines the codebook of codevectors and a plurality of constant value hyperplanes, comprising:
  (1) a plurality of input data channels;
  (2) an index output channel;
  (3) an internal comparator;
  (4) a plurality of internal storage registers for storing the input vector, data from the hyperplane constant input channel, the hyperplane index data channel, and the index output channel;
  (5) an internal data buffer;
  (6) a plurality of internal storage registers; and
  (7) internal multiplexer;

(b) an external memory module which contains information about the plurality of hyperplanes used in the search; and (c) a memory index register which stores the address of the location to be accessed in the external memory module using a comparison in the processing element of a hyperplane constant associated with each constant value hyperplane and an input vector corresponding to a hyperplane index.

11. The circuit for performing a fast search of a codebook of codevectors of claim 10, wherein the plurality of input data channels consists of:
  (a) an input data channel;
  (b) a hyperplane constant input data channel; and
  (c) a hyperplane index input data channel;

12. The circuit for performing a fast search of a codebook of codevectors of claim 11, wherein the plurality of internal storage registers consists of:
  (a) an internal comparison storage register;
  (b) an internal hyperplane constant storage register; and
  (c) an internal hyperplane index storage register.

13. The circuit for performing a fast search of a codebook of codevectors of claim 11, wherein the internal data buffer consists of k registers operating as a word level shift register and is used as a data buffer and k represents codevector dimension.

14. The circuit for performing a fast search of a codebook of codevectors of claim 13, wherein the internal comparison storage register consists of k registers for storing the input to be used for comparison during log N cycles over a time window and N represents number of codevectors.

15. The circuit for performing a fast search of a codebook of codevectors of claim 14, wherein the data input channel consists of means for receiving an element of the input vector every cycle.

16. The circuit for performing a fast search of a codebook of codevectors of claim 15, wherein the hyperplane constant data channel and hyperplane index data channel consist of means for comparing an element of the input vector and hyperplane constant from hyperplane data received from the external memory module with input vector data in the data input channel.

17. The circuit for performing a fast search of a codebook of codevectors of claim 16, wherein the memory index register consists of means for fetching data corresponding to a next sequential level of the search tree, wherein output is available to the memory index register during a log Nth cycle of each window.

18. A circuit for performing a fast search of a codebook of codevectors, the circuit comprising;

(a) a processing element which utilizes a tree search to form a search tree which determines the codebook of codevectors and a plurality of constant value hyperplanes, comprising means for compressing data in the form of a plurality of input vectors into a set of identification indices associated with the codebook of codevectors, said data compression means comprising:
  (1) means for receiving the plurality of input vectors;
  (2) means for defining an n-dimensional box containing the set of training vectors;
  (3) means for repeatedly dividing the n-dimensional box into a set of n-dimensional subboxes containing an equal number of training vectors by using constant value hyperplanes;
  (4) means for selecting a center point of each subbox and assigning a codebook vector to said center point;
  (5) means for storing the codebook of codevectors and the set of constant value hyperplanes;
  (6) means for searching the codebook of codevectors and matching the plurality of input vectors to the codebook of codevectors using the constant value hyperplanes and assigning an identification index to each input vector based on a closest codebook vector; and
  (7) means for transmitting the set of identification indices and the codebook of codevectors;

(b) an external memory module which contains information about the plurality of hyperplanes used in the search; and (c) a memory index register which stores the address of the location to be accessed in the external memory module using a comparison in the processing element of a hyperplane constant associated with each constant value hyperplane and an input vector corresponding to a hyperplane index.

19. The circuit for performing a fast search of a codebook of codevectors of claim 18, wherein the means for repeatedly dividing the n-dimensional box into a set of n-dimensional subboxes containing an equal number of training vectors by using constant value hyperplanes consists of dividing the n-dimensional box and subboxes so that each subbox contains an equal number of training vectors and the constant value hyperplane divides the n-dimensional box or subbox along its longest dimension.

20. A method for searching a set of vectors to determine a vector closest to an input vector, the method comprising:
  (a) selecting a set of training vectors;
  (b) partitioning an n-dimensional space into a box b containing the set of training vectors wherein n represents vector dimension;

(c) dividing the box b into two subboxes $b_1$ and $b_2$ containing an equal number of training vectors using a hyperplane defined by a constant perpendicular to a longest dimension of box b;

(d) recursively finding a pair of training vectors contained in all remaining boxes whose distance is maximum among all pairs of vectors and subsplitting the box containing the pair of training vectors using a hyperplane defined by a constant into two subboxes containing an equal number of training vectors until a predetermined number of subboxes is obtained;

(e) selecting a center point of each subbox and assigning a codevector to the center point; and (f) determining the closest codevector to an input vector by comparing the input vector to the hyperplanes and determining the subbox which contains the input vector.

* * * * *